United States Patent
Babonneau et al.

(10) Patent No.: US 7,542,417 B2
(45) Date of Patent: Jun. 2, 2009

(54) METHOD AND DEVICE FOR CONTROLLING DATA PACKET TRAFFIC AT THE INPUT OF A NETWORK, AND CORRESPONDING COMPUTER PROGRAM AND NETWORK EQUIPMENT

(75) Inventors: Gerard Babonneau, Thorigne Fouillard (FR); Wissem Loudhaief, Rennes (FR)

(73) Assignee: France Telecom, Paris (FR)

( * ) Notice: Subject to any disclaimer, the term of this patent is extended or adjusted under 35 U.S.C. 154(b) by 131 days.

(21) Appl. No.: 10/553,617

(22) PCT Filed: Apr. 16, 2004

(86) PCT No.: PCT/FR2004/000955

§ 371 (c)(1),
(2), (4) Date: Aug. 9, 2006

(87) PCT Pub. No.: WO2004/095783

PCT Pub. Date: Nov. 4, 2004

(65) Prior Publication Data

US 2007/0058548 A1 Mar. 15, 2007

(30) Foreign Application Priority Data

Apr. 18, 2003 (FR) .................................. 03 04903

(51) Int. Cl.
G01R 31/08 (2006.01)
(52) U.S. Cl. ..................................................... 370/230
(58) Field of Classification Search ................. 370/230, 370/230.1, 231–235, 235.1
See application file for complete search history.

(56) References Cited

U.S. PATENT DOCUMENTS 6,247,061 B1 * 6/2001 Douceur et al. ............. 709/240
6,748,435 B1 * 6/2004 Wang et al. ................. 709/225

(Continued)

OTHER PUBLICATIONS

M.F. Alam et al., "Traffic Shaping for MPEG Video Transmission Over the Next Generation Internet", Computer Communications 23 (2000), www.elsevier.com/locate/comcom, pp. 1336-1348.

(Continued)

Primary Examiner—Kwang B. Yao
Assistant Examiner—Candal Elpenord
(74) Attorney, Agent, or Firm—Westman, Champlin & Kelly, P.A.; David D. Brush (57) ABSTRACT

The invention relates to a method of controlling data packet traffic at the input of a network, whereby the traffic comprises N streams and/or substreams which are each associated with a priority level, N=2, and each of the aforementioned packets is marked with the priority level associated with the stream or substream to which said packet belongs. The inventive method comprises a step employing a token bucket mechanism with N operating levels and N token buffers each containing a number of available tokens, the tokens of each of the N token buffers being used to process one of the N priority levels. Moreover, each of the packets is accepted or refused according to whether or not it is possible for same to be attributed tokens depending on the tokens available at least in the token buffer which is used to process the priority level of each packet. In one particular embodiment of the invention, the tokens from the N token buffers are shared between the N priority levels, and a packet with priority level i can be attributed tokens from a token buffer which is associated with priority level j, said level having less priority, when there are not sufficient tokens available in the i priority level token buffer.

18 Claims, 3 Drawing Sheets

U.S. PATENT DOCUMENTS

| | | | |
|---|---|---|---|
| 6,862,265 B1* | 3/2005 | Appala et al. | 370/235 |
| 6,901,050 B1* | 5/2005 | Acharya | 370/230.1 |
| 6,925,055 B1* | 8/2005 | Erimli et al. | 370/229 |
| 7,085,236 B2* | 8/2006 | Oldak et al. | 370/235.1 |
| 7,095,753 B1* | 8/2006 | Milliken et al. | 370/465 |
| 2002/0039349 A1* | 4/2002 | Malaney et al. | 370/230.1 |
| 2002/0087715 A1* | 7/2002 | De Cnodder et al. | 709/235 |
| 2002/0114334 A1* | 8/2002 | Yang | 370/395.1 |
| 2004/0221032 A1* | 11/2004 | Bernstein et al. | 709/224 |

OTHER PUBLICATIONS

S. Blake et al., "An Architecture for Differentiated Services", RFC2475, The Internet Society, 1998, pp. 1-36.

Martin Devera, "Hierachiacal Token Bucket Theory", XP-002255408, Internet Publication, May 5, 2002, pp. 1-4.

Martin Devera, "Issues Regarding 2.4 Kernels", XP-002255409, Internet Publication, 2002, pp. 1-3.

Bert Hubert, "Linux Advanced Routing & Traffic Control", XP-002255410, Internet Publication, Jul. 22, 2002, pp. 1-13.

M. Shreedhar et al., "Efficient Fair Queuing using Deficit Round Robin", XP-002255411, Sigcomm, 1995, pp. 1-12.

Debanjan Saha et al., Carry-Over Round Robin: A Simple Cell Scheduling Mechanism for ATM Networks, IEEE/ACM Transactions on Networking, vol. 6., No. 6, Dec. 1998, XP-002255412, pp. 779-796.

Martin Devera, "HTB Linux Queuing Discipline Manual- User Guide", HTB Manual-User Guide, http://luxik.cdi.cz/~devik/qos/htb/manual/userg.h, May 5, 2002, pp. 1-7.

Thomas Bonald et al., "Drop Behavior of RED for Bursty and Smooth Traffic", IEEE, 1999, pp. 257-259.

Jitae Shin et al., "Aggregated QoS Mapping Framework for Relative Service Differentiation-Aware Video Streaming", International Packet Video Workshop, KRKYONGJU, May 2001, pp. 1-10.

* cited by examiner

METHOD AND DEVICE FOR CONTROLLING DATA PACKET TRAFFIC AT THE INPUT OF A NETWORK, AND CORRESPONDING COMPUTER PROGRAM AND NETWORK EQUIPMENT

CROSS-REFERENCE TO RELATED APPLICATION

This Application is a Section 371 National Stage Application of International Application No. PCT/FR2004/000955, filed Apr. 16, 2004 and published as WO 2004/095783 on Nov. 4, 2004, not in English.

FIELD OF INVENTION

The field of the invention is that of communications networks and especially, but not exclusively, IP type or equivalent networks.

More specifically, an embodiment of the invention concerns a method for controlling data packet traffic at the input of a network when the traffic comprises a plurality of streams and/or sub-streams each associated with a priority level, and/or each of the packets is marked with the priority level associated with the stream or sub-stream to which this packet belongs. In other words, the invention concerns a network mechanism used to optimise the flow of traffic entering a network.

The invention has many applications, such as for example the control of multimedia streams (for example MPEG streams), alone or in aggregates, or again the control of a multiplex of streams of different natures (for example a video/audio stream multiplexed with a TCP stream), on an ADSL access.

BACKGROUND OF THE INVENTION

The network context in which the present invention is situated shall now be briefly presented.

The improvement of computer performance as well as the bit rates offered by new generations of networks are opening the way for novel services based on multimedia streams. In fact, the quantity of audiovisual information transmitted on the networks (for example of the IP ("Internet Protocol")) type is constantly on the increase, and the compression algorithms (for example of the MPEG ("Moving Picture Experts Group" type)) are improving, offering better quality with lower bit rates. However, today, the level of quality is not always acceptable. While each link in the chain has intrinsic capacities to provide this quality, the end-to-end positioning of these links and the sharing of the IP network resources by numerous users sometimes gives mediocre results.

In general, the transmission of information in an IP network relies on the transport layer for quality control between the source and the receivers. This layer, located between the routing and the applications, is traditionally set up by the TCP ("Transmission Control Protocol)". From the applications viewpoint, the TCP is responsible for retransmitting lost or poorly received information through a check at the session. From a network viewpoint, certain protocol parameters enable the detection of possible congestion, and the matching of the bit rates of the source to the constraints of the network. The goal then is to limit the bit rate if the network cannot let through everything, and to avoid the sending of packet that will be lost. Many studies today are seeking to apply equivalent mechanisms to video streams with the real-time constraints of a dynamic matching of the encoders to the available bit rate.

However, owing to the substantial reaction time between one or more customers and the video source, the real-time and audiovisual protocols presently perform but few processing operations and are limited chiefly to the marking of the sending time and the packaging of the packets of the application in order to route them in the IP (for example the RTP/UDP) layer, and it is left to the applications to deal with the received data.

The development of networks is offering the possibility of managing "quality of service" (QoS) in routers. Now, it is relevant to note that this is the place in which the greatest losses occur in the IP networks, and mechanisms are implemented at this level in order to selectively process the different streams so as to achieve quality objectives with the utmost efficiency. The means used to improve the quality of the streams transmitted are the subject of research by the "IntServ" (integrated services) and "DiffServ" ("differentiated services") groups at the IETF (Internet Engineering Task Force):

"IntServ" defines means to reserve a resource in terms of guaranteed bit rate between two nodes of a network;

"DiffServ defines means to dynamically control the stream aggregate bit rate as a function of the load of the network.

As compared with end-to-end solutions (analogous to the TCP), localized solutions in routers have several advantages:

they remove the need for any session constraint;

they are also adapted to real time because their action in the routers is immediate without necessitating any return of information from the users;

they are also naturally suited to selective broadcasting ("multicast" broadcasting) because they are independent of the number of users supplied by the stream and independent of the reports coming from a variable number of users.

The processing operations in the routers rely on a distinction of the packets arriving in the routers supporting "quality of service" (QoS").

This distinction exists naturally in MPEG streams because the compression of the MPEG video streams leads to a sequence of data of different and non-independent natures. Three types of images can be distinguished: I, P and B. The I (Intra) type images are each encoded without making reference to another image, the compression being limited to the reduction of spatial redundancy within each image. To optimise the quantity of information transmitted, the MPEG encoders exploit the fact that two consecutive images have little difference between them in general. A motion detection considers only the part that has changed relative to the previous image to obtain a piece of information on reduced size encoded in a P (predicted) type of image. Other means are used to obtain even more limited information by interpolating the motions between two I or P type images; these images are then of a B (bidirectional) type.

The size of the P images is generally far smaller than that of the I type images, and an encoding with few I type images gives far higher decoding quality for an equivalent bit rate. Thus, the loss of an image is not equivalent on the basis of the nature of information that it contains. This structure of information must lead to considering the importance or weight of each piece of information in its processing by the network.

Two reasons warrant the preservation of I type images:

the periodic re-synchronisation of the stream in the event of losses;

any changes of scene because it is no longer possible to rely on the previous images for motion encoding.

Another way of considering this weight of information is to subdivide the MPEG4 stream into several hierarchical levels to obtain quality that is variable as a function of the overall content received by the user. A hierarchical level N must rely on the presence of the N−1 lower levels to provide a quality complement. An elementary case lies in considering a video constituted by a basic stream (containing I and P images) and an enhancing stream (containing P and B images). For this elementary case, the basic stream in its totality is considered to have greater priority than the enhancing stream.

The natural distinction between images or streams in the MPEG traffic has to be exploited in the "DiffServ" routers for the selective processing of the different pieces of information in a video stream:

either by a marking of the TOS ("type of service") or DSCP ("Differentiated Services Code Point") fields of the packets by the video server, or by a classification made by the router, which also leads to a marking of the IP packets.

In the present document, the marking of the packets is considered to be possible in all cases. The means used to carry out this marking are considered to be well known to those skilled in the art. This point shall therefore not be discussed in detail.

When a situation of congestion appears in a router, the packets received are eliminated depending on the load and of their priority level.

A major characteristic of the data contained in these packets is their great variation as a function of the content of the scene. Now, the most vital information for restitution to the user is contained in the biggest bursts, and the main problem of "best effort" type IP networks is their difficulty in letting through bursts in the event of congestion.

As a consequence, the simple marking of the elementary streams of an MPEG stream is not sufficient for their optimum processing. Indeed, the usual "DiffServ" mechanisms are designed to accept bursts that are habitually found in the IP networks, with applications that are majority applications today: the transfer of URL ("Uniform Resource Locator") for Web applications and the transfer of files by FTP ("File Transport Protocol"). All these applications exploit the TCP whose mechanisms have been the subject of many studies designed to obtain a gradual rise in the load and an adaptation of the bit rate to the load of the network.

Now, the video streams bring this operation into question because their behaviour is qualified as being excessive, inasmuch as they are generally unaware of the state and load of the network. Furthermore, most of the mechanisms introduced into the IP networks have the goal of smoothing the streams in order to foster an efficient flow of traffic. Paradoxically, the encoders provide higher quality when they produce variable bit-rate streams, which are the streams most ill-treated in IP networks.

The introduction of video streams into the IP network therefore comes up against three contradictions:

increasing the quality of the encoding leads to the production, for a defined mean bit rate, of bursts of packets when the encoded sequence requires it;

the access networks offer a maximum bandwidth that is limited (including in ADSL ("Asymmetric Digital Subscriber Line") conditions because the applications are tempted to exploit a mean bit rate close to the maximum in order to provide better quality for users;

the bursts constitute the most important information because they correspond to a changes in scene or at least to a major change in the content of the image. Very often, these images are of the I (Intra) type whose loss is very critical because it becomes impossible to reproduce the following images, even if they are properly received.

We shall now present the prior techniques of traffic conditioning designed to reduce congestion in the networks.

It shall first of all be noted that studies on the application of shaping to MPEG streams in IP networks on the basis of UDP and RTP as transport protocols are very rare. Most of the studies are on ATM ("Asynchronous Transfer Mode") networks and the use of TCP as a transport protocol.

The traffic shaping and conditioning mechanisms are used in IP networks with "quality of service" (QoS). Reference may be made especially to M. F. Alam, M. Atiquzzaman, M. A. Karim, in "Traffic Shaping for MPEG video transmission over next generation internet" In this document, traffic smoothing or shaping (TS) is used to ensure compliance of the MPEG stream with the TSPEC ("Traffic Specifier") necessary for the reservation of resources in the "IntServ" networks. For the "DiffServ" networks, the processing is done by stream aggregates and therefore without excessive concern over applications. The traffic shaping (TS) algorithms are, on the contrary, widely used in encoding with the aim of controlling the bit rate of the encoder. This remains insufficient to control the streams at the network level.

The use of traffic shaping by smoothing (TS) or traffic policing (TP) to reduce congestion in the network may significantly improve the "quality of service" (QoS) level that the network is capable of delivering to the applications.

Smoothing (TS) smoothes the bursts by bufferizing the packets concerned by the excess of bursts in the boundary equipment of the network. It can reduce congestion to acceptable levels especially as the "scheduler" algorithms such as CBQ ("class-based queuing") or else PQ ("priority queuing") algorithms are not capable of doing it. When used alone, these mechanisms propagate the bursts in the network.

As in the case of smoothing (TS), traffic policing (TP) limits the bit rate of the traffic to the configured bit rate. However, instead of "bufferizing" the packets as in traffic shaping (TS), the non-compliant packets are either rejected or re-marked to reduce their priority level. Traffic policing (TP) therefore does not shape the traffic but it does not introduce any "bufferization" time either.

In the majority of the architectures that take "quality of service" (QoS), there is a service contract between the network service provider (NSP) and the application service provider (ASP). In ATM networks, this contract is called a "traffic contract". In "DiffServ" networks, the contractualization aspects are dealt with in the service level agreement (SLA) and more specifically in the service level specification (SLS).

The following document is also known: RFC2475, "An Architecture for Differentiated Services, December 1998. It states that the traffic sources may carry out the tasks of traffic classification and conditioning. Indeed, the traffic may be marked before it leaves the source domain. This is called "Initial Marking" or "Pre-marking". The advantage of initial marking is that the preferences and the needs of the applications may be better taken into account to decide which packets must receive better processing in the network.

Prevention against the overload of a given service class is not an easy task in "DiffServ" networks. Furthermore, in the event of overload in a service class, it must be noted that all the streams of this service class suffer from deterioration in "quality of service" (QoS).

Furthermore, several mechanisms used in the implementation of "DiffServ" work less efficiently in the presence of bursts. The RED ("Random Early Drop") mechanism for example is more efficient when it is applied to smoothed traffic. Else, it is these small streams that are penalised while the streams in bursts do not undergo any significant improvement.

The MPEG streams are characterized by the fact that they have a bursty nature and by their sensitivity to packet losses. These losses cause a deterioration of subjective quality, but it is very difficult to foresee the level of this deterioration caused by losses. This deterioration is closely related to the nature of the information conveyed by the lost packets. The error-correction mechanisms are used during the decoding to overcome the losses.

The management of the MPEG streams in the network or even in the edge routers (ER) is a complicated task. The network service provider (NSP) is not obliged to process the MPEG streams differently. Moreover, the traffic aggregate resulting from several audiovisual streams is generally difficult to describe:

the packets arrival process is auto-similar
there is great variation in the data conveyed by the packets;
the dynamic range of the protocols One solution consists in marking the packets and assigning them the appropriate "quality of service" (QoS) level before they leave the domain of the Internet service provider (ISP). The media access gateway (MAG) is for example responsible for this task. This MAG manages the traffic according to the specified SLS. This approach facilitates the negotiation of SLA/SLS for services in streaming mode and dictates a particular profile on the client.

Among present-day techniques, the most widespread one used for traffic control is the WRED ("Weighted Random Early Drop") which consists of a loss of packets that is random and different as a function of the marking of the packets. This mechanism is based on an average rate of filling of the sending queue on a link of a network. However, this technique introduces a random character for the packet rejection, and the queue filling rate is not optimised. Depending on the sizes of the bursts and the frequency, these cases of rejection may occur for a low queue filling rate or a very high queue filling rate. This leads, firstly, to under-utilisation of the queue and, secondly, to the reservation of substantial memory size for the making of this queue. This problem exists for any type of application, and it is even more real for audiovisual streams because of their big bursts.

To state this point in detail, it is very important to note, first of all, that video stream bursts are unpredictable in size as well as in duration while at the same ensuring a mean bit rate during a period of about one second. This time slot for the computation of the mean bit rate is far too great to obtain reasonable sizes of the associated queues. In fact, the routers react by computing the filling averages for about 10 packets received, whereas certain bursts may substantially exceed 20 packets.

Thus, a succession of bursts may lead to cases of rejection by saturation of the capacity of the queue, inhibiting the normal working of the mechanism. On the contrary, when low traffic occurs after a sequence of bursts, the mean value may temporarily remain abnormally high and packets are rejected at a time when the queue is practically empty.

SUMMARY OF THE INVENTION

The WRED mechanism is therefore not suited to the control of streams characterised by mean value on a fixed duration.

An embodiment of the invention is aimed especially at overcoming these drawbacks of the prior art and providing an optimal solution in the event of congestion of the network.

More specifically, one of the goals of an embodiment of the present invention is to provide a method and device for traffic control that can be used to control bursts and smooth traffic on a set of streams and/or sub-streams associated with priority levels.

In other words, it is a goal of an embodiment of the present invention to provide a method and a device of traffic control to protect important information from bursts, in order to provide a solution to the contradiction between the optimisation of a stream (for example a video stream) containing bursts and a smoothing of the bursts for quality transport in the network.

It is also a goal of an embodiment of the invention to provide a method and device of this kind that are simple to implement and cost little.

It is another goal of an embodiment of the invention to provide such a method and device making it possible to efficiently propose traffic contracts (SLA/SLS) between network operators and service providers.

One embodiment of the invention relates to a method of controlling data packet traffic at the input of a network, the traffic comprising N streams and/or sub-streams which are each associated with a priority level, N 2, each of the packets being marked with the priority level associated with the stream or sub-stream to which said packet belongs, said method comprising a step for implementing a token bucket mechanism with N operating levels with N token buffers, each containing a number of available tokens, the tokens of each of the N token buffers being used to process one of the N priority levels, each of the packets being accepted or rejected depending on whether or not it is possible for tokens to be assigned to it depending on the tokens available at least in the token buffer used to process the priority level of said packet.

The general principle of an embodiment of the invention therefore uses a multi-layer token bucket (MLTB) to reject the packets outside a profile that is required and characterized by the N levels of operation of the multi-layer token bucket. Each packet undergoes processing according to a marking corresponding to its priority level. The accepted packets are placed in a queue.

The multi-layer token bucket enables the selective and joint processing of several stream priority levels. It is well suited to the characterising of traffic between the size of the bursts at input and the flow of traffic at output. It is known that, in the event of congestion of the network, it is an illusion to seek available bandwidth. The setting of the parameters of the multi-level token bucket ensures a relationship between the priority levels to balance the operating constraints between bit rates by priority levels and the bursts acceptable by the token bucket according to the constraints of the applications conveyed. The characterising of the parameters of the N sets of parameters of the multi-layer token bucket provides for many solutions and can be adapted to almost all cases of operation:

one extreme case is that of behaviour with N sets of independent parameters acting as independent token bucket;
another extreme case is that of the possibility that the level with the highest priority will take all the tokens, leading to a rejection of the packets of all the other levels;
between these two extremes, all configurations are possible, permitting more bursts or fewer bursts or higher bit rate or lower bit rate reserved per level.

An embodiment of the invention therefore permits the processing of bursts at the levels having the highest priority, because, for each priority level, there is an available reserve to cope with any sudden arrival of a set of data that should not be rejected.

It may be recalled that a usual token bucket has only one level of operation (it has only one set of parameters) and therefore processes all the packets without distinction. In the event of congestion of the network, the packets are rejected independently of their priority level.

It will be noted that an embodiment of the present invention is totally compatible with unicast and multicast IP streams.

It will also be noted that an embodiment of the present invention enables the transmission, in a same class of service, of several groups of streams with different priorities. In particular, an embodiment of the invention makes it possible to provide processing adapted to a video stream or group of video streams (IPB or hierarchical) in compliance with a contractualized traffic profile (SLS) by characteristic values of the token bucket type. Indeed, the easily measurable and adaptable parameters of a multi-layer token bucket (MLTB) are an efficient means of proposing (SLA/SLS) traffic contracts between network operators and service providers. The presence of priority information leads to the specifications of this bucket. The numerous variations of this bucket are a means of offering service classes adapted to the requirements of the clients. Whatever the applications, the traffic profile brings into play the main elements of characterisation of a stream in a network: the bit rate and the time limit. An embodiment of the invention is therefore a means of defining a contract with a compromise negotiated between the bit rate, the size of the bursts and the transmission time.

In a first advantageous application of the invention, the traffic comprises N sub-streams each corresponding to one of the N hierarchical levels of a hierarchical stream or an aggregate of hierarchical streams.

This is, for example, an audio/video hierarchical stream comprising the following sub-streams: an audio sub-stream, a basic video sub-stream and an enhancement video sub-stream.

In a second advantageous application of the invention, the traffic comprises N sub-streams each corresponding to one of the N types of images of a multimedia stream or of an aggregate of multimedia streams.

It is, for example, an MPEG video stream comprising three sub-streams corresponding to three types of images I, P and B.

In a third advantageous application of the invention, the traffic comprises N streams each corresponding to one of the streams of a multiplex of at least two streams.

This is, for example, a video/audio stream multiplexed with a TCP stream on an ADSL access.

Advantageously, the traffic comprises N streams and/or sub-streams belong to a same class of service.

Thus, through the multi-level token bucket, the invention enables the transmission, in a same class of service, of several streams and/or sub-streams with different priorities. It is possible to distinguish several classes of service such as, for example, the "streaming" class (containing audio and video streams), the "priority TCP" class, the "IP Network Best Effort" class etc. and use a multi-layer token bucket for each class. Each class of service may be defined by the marking of the packets, the source or destination IP address of the packets, the protocol used for the packets, etc.

Preferably, the rejected packets are discarded.

The rejected packets are those that do not comply with the traffic profile defined by the parameters of the N operating levels of the multi-layer token bucket.

Another option that gives lower performance but nevertheless comes within the framework of the present invention lies in transmitting the rejected packets after having re-marked them with a lower priority level. This option however has the drawback of increasing the probability of the rejection of packets in the congested nodes of the network.

Advantageously, the network is of an IP or equivalent type.

According to one advantageous characteristic, each of the N levels of operation of a token bucket mechanism is managed by a regulator $b_i(r_i, bm_i)$, $i \in \{1$ to $N\}$, with:

$r_i$ as the nominal bit rate of the regulator;

$bm_i$ the maximum size of the token buffer of the regulator;

$b_i(t)$ the instantaneous value of the filling of the token buffer of the regulator.

Preferably, the tokens of the N token buffers are shared between the N priority levels, and a packet with priority level i can be assigned tokens from a token buffer associated with a priority level j having lower priority when the tokens available in the token buffer of the priority level i are not sufficient.

Thus, the bursts having the levels of the highest priority are given the advantage.

Advantageously, for each priority level apart from the priority level having the highest priority, a quantity of tokens reserved exclusively for the packets having said priority level is guaranteed.

Thus, a minimum resource is guaranteed for each priority level, without excluding a partially shared use of the resources (i.e. tokens of different levels of operation of the multi-layer token bucket).

In a first particular embodiment of the invention, the assigning of tokens to a packet of priority level i is done in a discontinuous packet mode and the method consists in assigning:

either tokens available in the token buffer of priority level i;

or tokens available in a token buffer of a lower priority level j, when the tokens available in the token buffer of priority level i are not sufficient.

Thus, in the discontinuous mode, a packet can take resources (tokens) of only one level of operation of the multi-layer token bucket.

In a second particular embodiment of the invention, the assigning of tokens to a packet of priority level i is done in a continuous bit mode and the method consists in assigning:

tokens available in the token buffer of priority level i;

and, as a complement, tokens available in at least one token buffer of priority level j having lower priority, when the tokens available in the token buffer of priority level i are not sufficient.

In other words, in the continuous mode, a packet can take resources (tokens) of several levels of operation of the multi-layer token bucket at a time.

Advantageously, the packets accepted by the token bucket mechanism with N operating levels are placed in a queue. Said method furthermore comprises a step for implementing a token bucket mechanism with only one level of operation with only one token buffer, so as to take the packets contained in the queue and send them on the network in carrying out a smoothing of the traffic by limiting the instantaneous bit rate to a value acceptable by the network.

The token bucket with only one operating level, known as a token bucket traffic shaper (TBTS), therefore makes it possible to limit the peak bit rates sent out by the network equipment supporting the invention. It sets up a time out on the bursts when they exceed the bit rate tolerated in the network.

The method uses, for example, a memory zone whose input is managed by the multi-layer bucket (control of bursts) and whose output is managed by the single-level bucket (traffic shaping).

A further embodiment of the invention relates to a computer program comprising program code instructions for the execution of the steps of the method as described here above, when said program is executed on a computer.

A further embodiment of the invention relates to a device for controlling data packet traffic at the input of a network, the traffic comprising N streams and/or sub-streams which are each associated with a priority level, N 2, each of the packets being marked with the priority level associated with the stream or sub-stream to which said packet belongs, said device comprising means for implementing a token bucket mechanism with N operating -levels with N token buffers, each containing a number of available tokens, the tokens of each of the N token buffers being used to process one of the N priority levels, each of the packets being accepted or rejected depending on whether or not it is possible for tokens to be assigned to it depending on the tokens available at least in the token buffer used to process the priority level of said packet.

Preferably, said device comprises means for sharing tokens of the N token buffers between the N priority levels, a priority i level packet being possibly assigned tokens from a token buffer associated with a priority level j having lower priority when the tokens available in the token buffer having priority level i are not sufficient.

Advantageously, for each priority level apart from the highest priority level, said sharing means include means for ensuring a quantity of tokens reserved exclusively for the packets possessing said priority level.

A further embodiment of the invention relates to a piece of network equipment comprising a control device as mentioned here above, said network equipment belonging to the group comprising:

network equipment located between a network of an application or service provider and a network of a network service provider, constituting said network at whose input data packet traffic is controlled;

routers included in the nodes of a network of a network service provider, constituting said network at whose input a data packet traffic is controlled.

Other features and advantages of one or more embodiments of the invention shall appear from the following description of a preferred embodiment of the invention, given by way of an indicative and non-restrictive example, and from the appended drawings.

DETAILED DESCRIPTION OF THE PREFERRED EMBODIMENTS

One embodiment of invention therefore relates to a method of controlling data packet traffic at the input of a network. The traffic is of the type comprising N streams and/or sub-streams which are each associated with a priority level, N 2. Each of the packets is marked with the priority level associated with the stream or sub-stream to which it belongs.

For example, the embodiment enables the transmission, as a priority, of the essential information of a video stream or of several video streams grouped together in an aggregate. Depending on the nature of the stream, this distinction is possible for example either by IBP type images (see definition above), or by the n layers of a hierarchical stream. While, in the former case, the mean bit rate of the images I remains low as compared with the overall bit rate, in the latter case, the information that is most important and needs the maximum protection is defined by the fraction of the overall bit rate occupied by the basic layer, and capable of representing up to 50% of the stream. In general, the basic layer is the only one to contain reference information contained in the images I.

In an aggregate, all the pieces of data having the same level of priority undergo the same processing. For example, all the basic streams or all the images I are processed as a single stream with a bit rate higher than that of a video alone.

Figure 1:
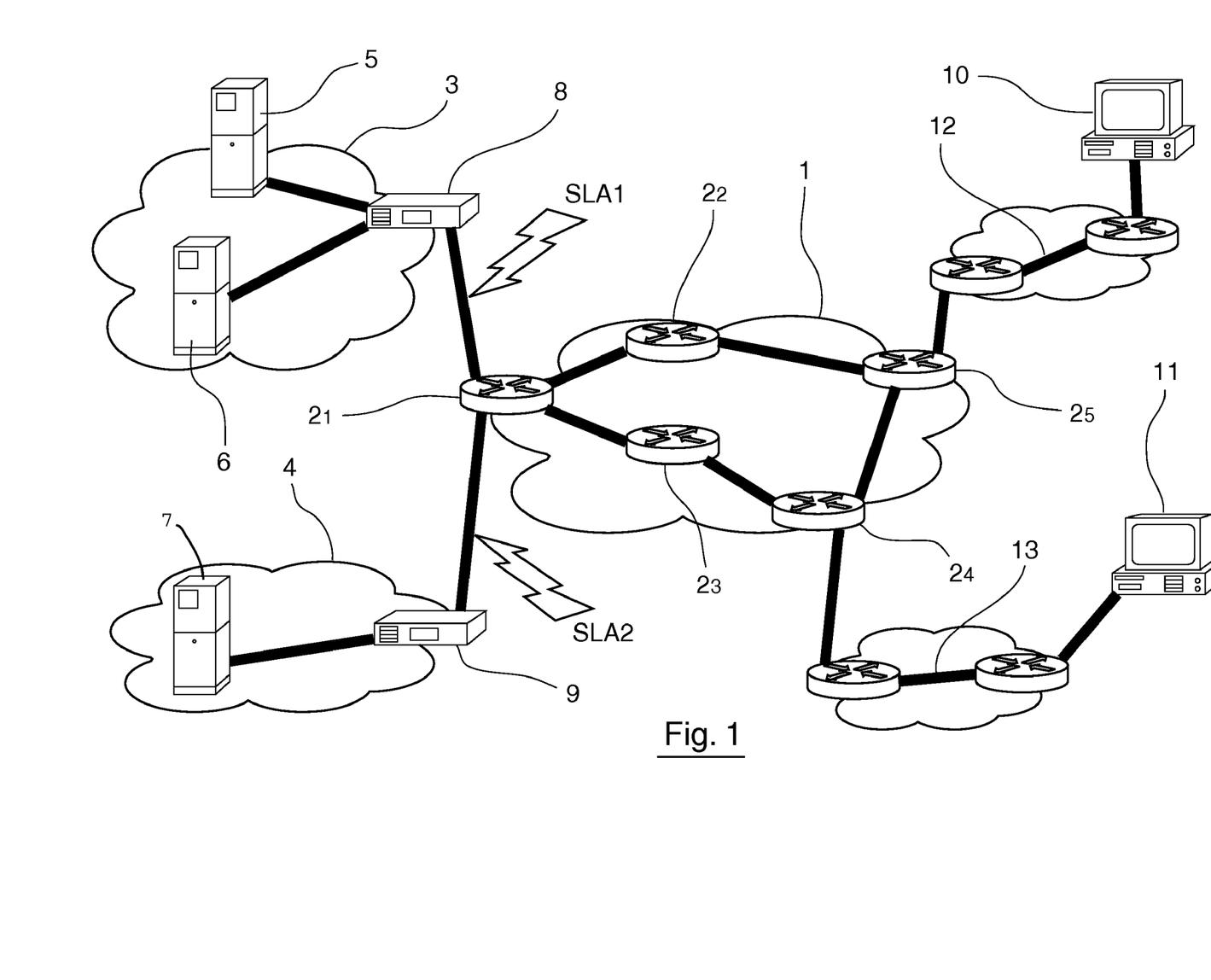
FIG. 1 presents an example of a network architecture in which the traffic control method of the invention can be implemented.

Referring now to FIG. 1, an example is given of a network architecture in which the traffic control method according to one embodiment of the invention can be implemented.

This example considers the case of Internet service providers (ISPs) offering a video transmission service in streaming mode.

The (simplified) example of architecture illustrated in FIG. 1 comprises:

a DiffServ type IP network 1, managed by a network operator also called a network service provider (NSP) and comprising a plurality of routers $2_1$ to $2_5$ included in the nodes of the IP network;

two streaming service provider networks 3 and 4, one comprising two servers 5 and 6, and the other comprising one server 7. Each network of service providers 3, 4 furthermore comprises a piece of edge equipment 8, 9 connected to one of the routers of the IP network, called an edge router $2_1$, which is responsible for sending the data from a server to a main artery of an IP network core;

two client terminals 10 and 11, each connected to the IP network 1, for example through an ADSL link 12, 13.

It is assumed that there are two traffic contracts (symbolised by the arrows referenced SLA1 and SLA2 respectively in FIG. 1): one between the operator of the IP network I and the service provider whose network is referenced 3, and the other between the operator of the IP network 1 and the service provider whose network is referenced 4.

In one embodiment, the method is implemented in a piece of network equipment forming a traffic conditioner for entry into the IP network 1. This piece of network equipment may be located between the network of the service provider 3, 4 and the IP network 1:

either in one of the pieces of edge equipment 8, 9 of the service provider networks 3 and 4;

or in the edge router $2_1$ of the IP network 1.

The network equipment implementing the method of an embodiment of the invention may also be any router placed at a congestion point in the network (especially for any access to an ADSL link).

Figure 2:
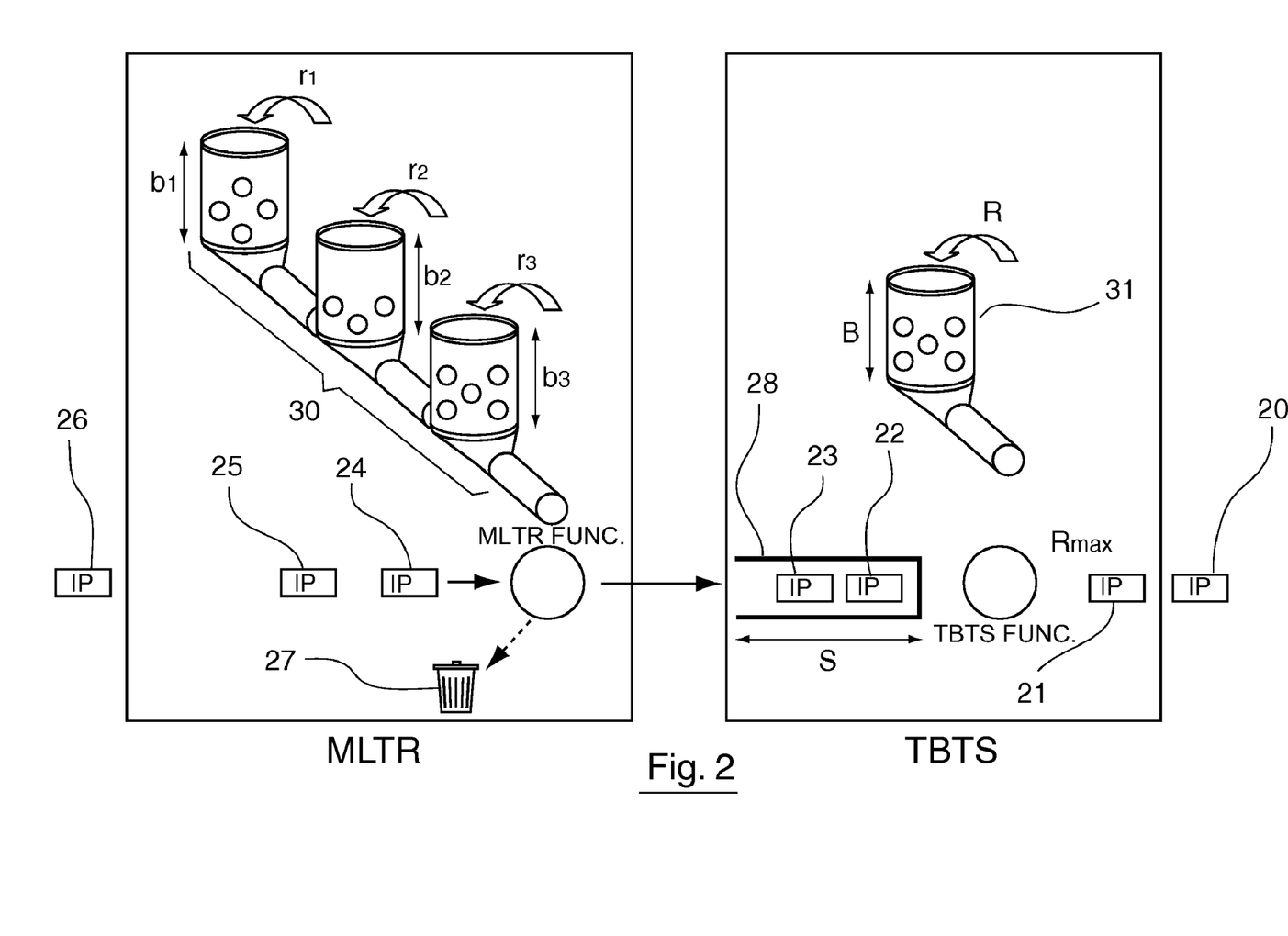
FIG. 2 illustrates a particular embodiment of the method according to the invention, implementing two functions, based on the use respectively of a multi-layer token bucket and a single-layer token bucket.

Referring now to FIG. 2, a particular embodiment of the method according to the invention is presented. It enables the protection of important information of the bursts and provides solutions to the contradiction between the optimisation of a video stream containing bursts and a smoothing of the bursts for quality transport in the network.

In this particular embodiment of the method according to the invention, the general mechanism forms a multi-layer decentralised traffic conditioner (MLDTC). It is constituted by two functions executed sequentially:

the first function is called the MLTR (multi-layer traffic regulator) because it constitutes a multi-layer traffic regulator. It controls bursts by hierarchical level. It is based on the implementation of a token bucket with N levels of operation (reference 30), with N virtual-token buffers. Each token buffer corresponds to one hierarchical level. Each operating level is defined by a set of parameters (see detailed discussion here below). The MLTR function provides for the assigning of tokens depending on the priority of the incoming packet and on the resource available in the corresponding token buffer. In the example of FIG. 2, N=3 and the representation of the bucket indicates only the distinction of the three sets of parameters (there is, in fact, only one bucket with three levels of operation);

the second function is called a token bucket traffic shaper or TBTS because it is based on a single-level token bucket type of algorithm (referenced 31) and performs a traffic-smoothing operation for a regular flow on the network in limiting the instantaneous bit rate to a value acceptable by the network. The buffer of the TBTS function has reasonable capacity to ensure lower cost for the systems and limited transfer time in the supply of information to the user. The trade-off for having finite size is the limiting of the bursts accepted at input to the network.

The MLTR function is adapted to the differentiated acceptance of the bursts according to the priority level. It can be applied to the IP packets (referenced 20 to 26 in FIG. 2) whose DSCP ("Differentiated Services Code point") field is marked either by the source or by a classification system. Each priority level i has its own parameters, for a single buffer, common to all three levels, but with variable levels of acceptance of the data packets. This mechanism meets the requirement of a video signal because it does not process all the information uniformly. Indeed, it may be recalled that an MPEG encoding leads to several levels of information which have to be processed differently according to their importance. The goal is to give preference to level i bursts over level j bursts, where the information is less important (j>i). The packets of level i then have the priority in the exploitation of the available resources.

Through the TBTS function, the same mean bit rate is obtained for different sizes of bursts, in taking account of the interval between them. Such a mechanism is well suited to bursts of the video streams, which are variable, or to the great diversity of the contents conveyed (sports, news, scenery etc).

A detailed description is now given of an exemplary embodiment of the MLTR function which carries out the regulation and control of bursts. In the description here below, a case is studied, by way of an example, where this MLTR function is based on a token bucket with three levels of operation (N=3).

Figure 3:
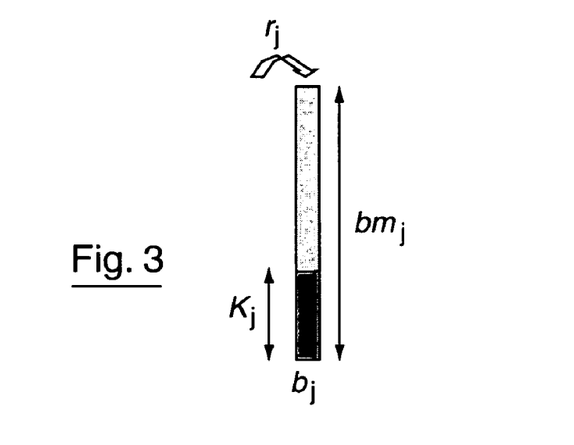
FIG. 3 illustrates a regulator managing a level of operation of the multi-layer token bucket illustrated in FIG. 2, as well as the use in this regulator of a parameter $K_j$ guaranteeing a minimum of resources for the priority level associated with this regulator.

As can be seen in FIG. 3, each level of operation i of the token bucket with three levels of operation 30 is managed by a regulator $b_i(r_i, bm_i)$, $i \in \{1, 2, 3\}$, with:

$r_i$ as the nominal bit rate of the regulator;

$bm_i$ the maximum size of the token buffer of this regulator;

$b_i(t)$ the instantaneous value of the filling of the token buffer of this regulator.

The size of the token buffer ($b_i$) dictates a maximum size for the bursts for each level. The tolerance of a level i regulator relative to large-sized bursts depends on the size of the token buffer $b_i$ and on the bit rate $r_i$.

The compliant packets (i.e. those that might have had tokens assigned to them by the multi-layer bucket 30) are placed on a buffer of packets to be sent 28, which forms a means for managing a queue. If an insufficient number of tokens is available in the multi-layer bucket, then the packets are considered to be non-compliant and are eliminated. They are discarded into the trash can referenced 27. Another option is to transmit these packets with a lower priority. However, the new marking of the packets in order to assign them lower priority increases the probability of the rejection of packets in the congested nodes.

To favour the bursts of the highest-priority levels, the three token buffers, b1, b2 and b3 are shared between the different levels. In other words, a packet with priority level i can be assigned tokens of a token buffer associated with a priority level j of lower priority (j>i) when the tokens available in the token buffer of priority level i are not sufficient.

However, because of this borrowing principle, there is a risk that the level i packets may use all the resources in tokens of the lower-priority levels j. This may prevent ensuring the nominal bit rate at the level j to the benefit of the level i. As illustrated in FIG. 3, the solution is to limit this borrowing by a parameter $K_j$, proper to the level j, the purpose of this parameter $K_j$ being to protect this level from the higher-priority levels in ensuring a quantity of resources (tokens) reserved exclusively for level j packets. Consequently, the parameter $K_j$ guarantees a token buffer filling threshold beyond which the packets of a higher-priority level can no longer help themselves. The parameter $K_j$ of the level j regulator is illustrated in FIG. 3.

The value of $K_j$ must be chosen such that $bmj \geq K_j \geq MTU$.

This amounts to ensuring the nominal bit rate and bursts limited by $K_j$ for the level j. The particular case where $K_j$ is is adapted to the useful size of a packet on the maximum transfer unit (MTU) network for an IP network corresponds to a guarantee of the nominal bit rate $r_j$ for the level j but without any guarantee of bursts. The resources in tokens could be used by the higher-priority levels.

The three sets of parameters defining the three levels of operation of the multi-layer token bucket can be described:

either by a representation of three independent buffers, with a shared use of the resources between the three levels;

or by a totalised representation of the resources more clearly bringing out the priorities between the levels and the interdependencies of operation coming from the sharing of the resources.

However, these representations are identical in their operation.

Figure 4:
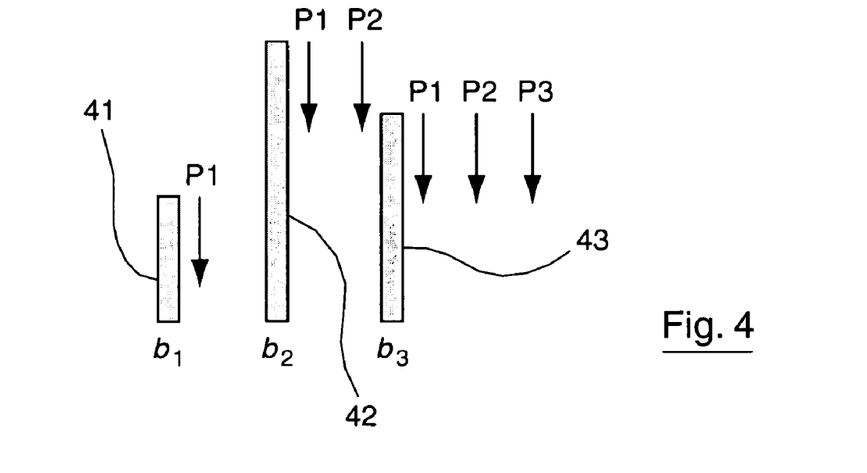
FIG. 4 illustrates an example of the assigning of tokens in the case where the operation of the multi-layer token bucket is described with independent buffers.

Referring now to FIG. 4, a description is provided of the operation of the multi-layer token bucket with independent buffers.

The reloading of the token buffers is computed for each of the three levels at the time of arrival of a new packet, as a function of the time separating it from the preceding packet.

$$\begin{cases} b_1(t+T) = \min[(b_1(t) + r_1.T), bm_1] \\ b_2(t+T) = \min[(b_2(t) + r_2.T), bm_2] \\ b_3(t+T) = \min[(b_3(t) + r_3.T), bm_3] \end{cases} \quad \text{(Equation 1)}$$

The packet arriving from level i and having a size $P_i$ is obtained by the following algorithm: (packet mode)

$$\begin{cases} \text{if}(P_1) \begin{cases} \text{if } (P_1 \le b_1) \Rightarrow b_1 = b_1 - P_1; \text{send;} \\ \text{else:if}(P_1 \le (b_2 - K_2)) \Rightarrow b_2 = b_2 - P_1; \text{send;} \\ \text{else:if}(P_1 \le (b_3 - K_3)) \Rightarrow b_3 = b_3 - P_1; \text{send;} \\ \text{else:loss;} \end{cases} \\ \text{if}(P_2) \begin{cases} \text{if } (P_2 \le b_2) \Rightarrow b_2 = b_2 - P_2; \text{send;} \\ \text{else:if}(P_2 \le (b_3 - K_3)) \Rightarrow b_3 = b_3 - P_2; \text{send;} \\ \text{else:loss;} \end{cases} \\ \text{si}(P_3) \begin{cases} \text{if } (P_3 \le b_3) \Rightarrow b_3 = b_3 - P_3; \text{send;} \\ \text{else:loss;} \end{cases} \end{cases} \quad \text{(Equation 2)}$$

FIG. 4 is a graphic depiction of this token-assigning algorithm in the case where the working of the multi-layer token bucket is described with independent buffers. It shows the possible use of the resources $b_1$, $b_2$ and $b_3$ for each of the levels. The thick lines (referenced 41, 42 and 43) show the filling of the token buffers (i.e. the number of tokens available) for each of the levels, and the arrows show the resources (i.e. the tokens) taken by the incoming packets (P1, P2 or P3) according to their priority.

Figure 5:
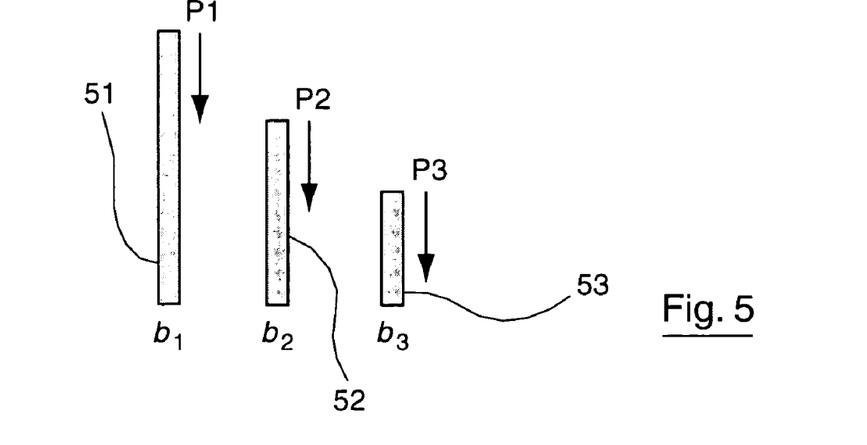
FIG. 5 illustrates an example of the assigning of tokens in the case where the operation of the multi-layer token bucket is described with correlated buffers.

Referring now to FIG. 5, a description is given of the operation of the multi-layer token bucket with correlated buffers.

The operation with three independent regulators $b_i(r_i, bm_i)$, $i \in \{1, 2, 3\}$ is equivalent to the operation with three dependent regulators:

$B_i(t)$ the instantaneous value of the filling of the virtual token buffer relative to the level i packets;

$BM_i$ the maximum size of the virtual token buffer relative to the level i packets.

The sizes of token buffers per level are obtained by:

$$\begin{cases} B_3 = b_3 \\ B_2 = b_2 + b_3 \\ B_1 = b_1 + b_2 + b_3 \end{cases} \quad \text{(Equation 3)}$$

This mode implies that $B1 \ge B2 \ge B3$

The reloading of the token buffers can then be expressed in a form equivalent to the Equation 1 by:

$$\begin{cases} B_1(t+T) = \min[(b_1(t) + r_1.T), bm_1] + \\ \quad \min[(b_2(t) + r_2.T), bm_2] + \min[(b_3(t) + r_3.T), bm_3] \\ B_2(t+T) = \min[(b_2(t) + r_2.T), bm_2] + \min[(b_3(t) + r_3.T), bm_3] \\ B_3(t+T) = \min[(b_3(t) + r_3.T), bm_3] \end{cases} \quad \text{(Equation 4)}$$

If it is assumed that $\min[(b_i(t)+r_i.T), bm_i] = b_i(t) + r_i.T$, (Equation 4) becomes:

$$\begin{cases} B_1(t+T) = b_1(t) + b_2(t) + b_3(t) + (r_1 + r_2 + r_3)T \\ B_2(t+T) = b_2(t) + b_3(t) + (r_2 + r_3)T \\ B_3(t+T) = b_3(t) + r_3.T \end{cases}$$

FIG. 5 is a graphic depiction of the token-assigning algorithm in the case where the working of the multi-layer token bucket is described with correlated buffers. It shows the possible use of the resources $B_1$, $B_2$ and $B_3$ for each of the levels. Just as in FIG. 4, the thick lines (referenced 51, 52 and 53) show the filling of the token buffers (i.e. the number of tokens available) for each of the levels, and the arrows show the resources (i.e. the tokens) taken by the incoming packets (P1, P2 or P3) according to their priority.

If the equations of the reloading express exactly the same behaviour for both approaches, the choice of the assigning of the tokens to the packets on arrival can be done in two alternative ways:

in discontinuous mode (packets): one packet can serve itself with only one regulator;

in continuous mode (bits): one packet can serve itself with several regulators at a time.

In the operation in discontinuous (packet) mode, the arrival of the packet is taken into account by the following algorithm:

$$\begin{cases} \text{if}(P_1) \begin{cases} \text{if}(P_1 \le B_1 - B_2) \Rightarrow B_1 = B_1 - P_1; \text{send;} \\ \text{else:if}(P_1 \le ((B_2 - B_3) - K_2)) \Rightarrow \begin{cases} B_2 = B_2 - P_1 \\ B_1 = B_1 - P_1 \end{cases}; \text{send;} \\ \text{else:if}(P_1 \le (B_3 - K_3)) \Rightarrow \begin{cases} B_3 = B_3 - P_1 \\ B_2 = B_2 - P_1 \\ B_1 = B_1 - P_1 \end{cases}; \text{send;} \\ \text{else:loss;} \end{cases} \\ \text{if}(P_2) \begin{cases} \text{if}(P_2 \le B_2 - B_3) \Rightarrow \begin{cases} B_2 = B_2 - P_2 \\ B_1 = B_1 - P_2 \end{cases}; \text{send;} \\ \text{else:if}(P_2 \le (B_3 - K_3)) \Rightarrow \begin{cases} B_3 = B_3 - P_2 \\ B_2 = B_2 - P_2 \\ B_1 = B_1 - P_2 \end{cases}; \text{send;} \\ \text{else:loss;} \end{cases} \\ \text{if}(P_3) \begin{cases} \text{if}(P_3 \le B_3) \Rightarrow \begin{cases} B_3 = B_3 - P_3 \\ B_2 = B_2 - P_3 \\ B_1 = B_1 - P_3 \end{cases}; \text{send;} \\ \text{else:loss;} \end{cases} \end{cases} \quad \text{(Equation 5)}$$

It must be noted that (Equation 2) and (Equation 5) are equivalent.

In this mode of discontinuous (packet) operation, a packet is served by the resources of the level corresponding to the packet (level i) or a level of lower priority (level j). It must be noted that the operation is not optimal, because an incoming package is rejected even if the sum of the available resources distributed on the three levels is sufficient.

In the operation in continuous (bit) mode, the arrival of the packet is taken into account by means of the following algorithm:

$$\begin{cases} \text{if}(P_1) \begin{cases} \text{if } (P_1 \le b_1) \Rightarrow b_1 = b_1 - P_1; \text{send}; \\ \text{else:if}((P_1-b_1) \le (b_1-K_2)) \Rightarrow \begin{cases} b_2 = b_2 - (P_1-b_1) \\ b_1 = 0 \end{cases}; \text{send}; \\ \text{else : if}((P_1-(b_1+(b_2-K_2))) \le (b_3-K_3)) \Rightarrow \begin{cases} b_3 = b_3 - (P_1-(b_1+(b_2-K_2))) \\ b_2 = K_2 \\ b_1 = 0 \end{cases}; \text{send}; \\ \text{else:loss}; \end{cases} \\ \text{if}(P_2) \begin{cases} \text{if}(P_2 \le b_2) \Rightarrow b_2 = b_2 - P_2; \text{send}; \\ \text{else:if}(P_2 \le (b_3-K_3)) \Rightarrow \begin{cases} b_3 = b_3 - P_2 \\ b_2 = 0 \end{cases}; \text{send}; \\ \text{else:loss}; \end{cases} \\ \text{if}(P_3) \begin{cases} \text{if}(P_3 \le b_3) \Rightarrow b_3 = b_3 - P_3; \text{send}; \\ \text{else:loss}; \end{cases} \end{cases}$$

In principle, this mode of continuous (bit) operation is more optimal than the discontinuous (packet) mode. Indeed, it enables the maximum use of the resources of the level itself before any request is made for resources at a lower-priority level.

A detailed description is now given of an exemplary embodiment of the TBTS function which provides for the shaping of the traffic.

The single-level token bucket 31, on which this TBTS function is based, is for example defined by the following parameters:

R, the mean bit rate;

$R_{max}$, the maximum bit rate at output;

B(t), the instantaneous value of the filling of the token buffer ($B_{max}$ is the maximum size of the token buffer);

S, the instantaneous value of the filling of the packet buffer 28 ($S_{max}$ is the maximum size of the packet buffer 28);

T, the time between the arrival of two consecutive packets;

τ, the duration of a burst of packets.

The compliant packets (i.e. those that were able to have tokens assigned to them by the single-level bucket 31) are transmitted while the non-compliant packets are delayed in the packet buffer 28 to be contained in the envelope of the targeted traffic. The size of the packet buffer 28 has to be handled with care because it may induce an additional time period which must remain reasonable.

The working of the single-level bucket 31 (and hence of the TBTS function) may be described by the following equations:

$$B(t+T) = \min[(B(t)+R.T), B_{max}]$$

$$R_{max}.\tau \le B_{max} + R.\tau \Rightarrow \tau \le \frac{B_{max}}{R_{max}-R}$$

The packet $P_i$ is taken into account through the following algorithm:

$$\text{if}(P_i) \begin{cases} \text{if}(P_i \le B) \Rightarrow B = B - P_i; \text{send}; \\ \text{else:bufferization}; \end{cases}$$

If $r_{max}$ is considered to be the maximum bit rate at the output of the MLTR function, the progress of the filling of the packet buffer 28 between the arrival of two consecutive packets may be described by the following equation:

$$S(t+T) \le S(t) - B_{max} + (r_{max} - R)T$$

and $S(t) - R.T - B_{max} \le S(t+T) \le S(t) + (r_{max} - R)T$

The invention claimed is:

1. Method of controlling data packet traffic at input of a network, the traffic comprising N streams and/or sub-streams which are each associated with a priority level, N≧2, each of the packets being marked with the priority level associated with the stream or sub-stream to which said packet belongs, wherein the method comprises:

a step of arrival of a packet and obtaining its priority level, a step of assigning tokens to said packet, if tokens are available for said packet, implementing a token bucket mechanism with N operating levels with N token buffers, each comprising a number of available tokens, the tokens of each of the N token buffers being used to process one of the N priority levels, wherein the tokens are assigned or not assigned to said packet depending on the tokens available at least in the token buffer used to process the priority level of said packet, and wherein each of the N operating levels is managed by a regulator $b_i(r_i, bm_i)$, i ∈ {1 to N}, with:

$r_i$ a nominal bit rate of the regulator;

$bm_i$ a maximum size of the token buffer of the regulator;

$b_i(t)$ an instantaneous value of the filling of the token buffer of the regulator;

a step of accepting said packet in a buffer forming a means for managing a queue, if the packet has been assigned tokens, a step of rejecting said packet, if it has not been assigned tokens.

2. Method according to claim 1, wherein the traffic comprises N sub-streams each corresponding to one of the N hierarchical levels of a hierarchical stream or an aggregate of hierarchical streams.

3. Method according to claim 1, wherein the traffic comprises N sub-streams each corresponding to one of the N types of images of a multimedia stream or of an aggregate of multimedia streams.

4. Method according to claim 1, wherein the traffic comprises N streams each corresponding to one of the streams of a multiplex of at least two streams.

5. Method according to claim 1, wherein the traffic comprises N streams and/or sub-streams belong to a same class of service.

6. Method according to claim 1, wherein the rejected packets are discarded.

7. Method according to claim 1, wherein the network is of an IP or equivalent type.

8. Method according to claim 1, wherein the tokens of the N token buffers are shared between the N priority levels, and a packet with priority level i can be assigned tokens from a token buffer associated with a priority level j having lower priority when the tokens available in the token buffer of the priority level i are not sufficient.

9. Method according to claim 8 wherein, for each priority level apart from the priority level having the highest priority, a quantity of tokens reserved exclusively for the packets having said priority level is guaranteed.

10. Method according to claim 8, wherein the assigning of tokens to a packet of priority level i is done in a discontinuous packet mode and the method comprises assigning:
    either tokens available in the token buffer of priority level i;
    or tokens available in a token buffer of a lower priority level j, when the tokens available in the token buffer of priority level i are not sufficient.

11. Method according to claim 8, wherein the assigning of tokens to a packet of priority level i is done in a continuous bit mode and the method comprises assigning:
    tokens available in the token buffer of priority level i;
    and, as a complement, tokens available in at least one token buffer of priority level j having lower priority, when the tokens available in the token buffer of priority level i are not sufficient.

12. Method according to claim 1, wherein:
    the packets accepted by the token bucket mechanism with N operating levels are placed in a queue, and
    said method furthermore comprises a step for implementing a token bucket mechanism with only one level of operation with only one token buffer, so as to take the packets contained in the queue and send them on the network in carrying out a smoothing of the traffic by limiting the instantaneous bit rate to a value acceptable by the network.

13. A computer readable medium encoded with computer executable instructions for the execution of a method of controlling data packet traffic at input of a network, when said instructions are executed on a computer, wherein the traffic comprises N streams and/or sub-streams which are each associated with a priority level N≧2, each of the packets being marked with the priority level associated with the stream or sub-stream to which said packet belongs, wherein the method comprises:
    a step of arrival of a packet and obtaining its priority level;
    a step of assigning tokens to said packet, if tokens are available for said packet, implementing a token bucket mechanism with N operating levels with N token buffers, each comprising a number of available tokens, the tokens of each of the N token buffers being used to process one of the N priority levels, wherein the tokens are assigned or not assigned to said packet depending on the tokens available at least in the token buffer used to process the priority level of said packet, and wherein each of the N operating levels is managed by a regulator $b_i(r_i, bm_i)$, $i \in \{1$ to $N\}$, with:
    $r_i$ a nominal bit rate of the regulator;
    $bm_i$ a maximum size of the token buffer of the regulator;
    $b_i(t)$ an instantaneous value of the filling of the token buffer of the regulator;
    a step of accepting said packet in a buffer forming a means for managing a queue, if the packet has been assigned tokens;
    a step of rejecting said packet, if it has not been assigned tokens.

14. Device for controlling data packet traffic at input of a network, the traffic comprising N streams and/or sub-streams which are each associated with a priority level, N≧2, each of the packets being marked with the priority level associated with the streams or sub-stream to which said packet belongs, wherein said device comprises:
    means for receiving a packet and obtaining its priority level;
    means for assigning tokens to said packet, if tokens are available for said packet, implementing a token bucket mechanism with N operating levels with N token buffers, each comprising a number of available tokens, the tokens of each of the N token buffers being used to process one of the N priority levels, wherein the tokens are assigned or not assigned to said packet depending on the tokens available at least in the token buffer used to process the priority level of said packet, and wherein each of the N operating levels is managed by a regulator $b_i(r_i, bm_i)$, $i \in \{1$ to $N\}$, with:
    $r_i$ a nominal bit rate of the regulator;
    $bm_i$ a maximum size of the token buffer of the regulator;
    $b_i(t)$ an instantaneous value of the filling of the token buffer of the regulator;
    means for accepting said packet in a buffer forming a means for managing a queue, if the packet has been assigned tokens; and
    means for rejecting said packet, if it has not been assigned tokens.

15. Device according to claim 14, comprising means for sharing tokens of the N token buffers between the N priority levels, a priority i level packet being possibly assigned tokens from a token buffer associated with a priority level j having lower priority when the tokens available in the token buffer having priority level i are not sufficient.

16. Device according to claim 15 wherein, for each priority level apart from the highest priority level, said sharing means include means for ensuring a quantity of tokens ($K_j$) reserved exclusively for the packets possessing said priority level.

17. Network equipment comprising a control device according to claim 14, wherein said network equipment belongs to the group comprising:
    network equipment located between a network of an application or service provider and a network of a network service provider, constituting said network at whose input data packet traffic is controlled; and
    routers included in the nodes of a network of a network service provider, constituting said network at whose input a data packet traffic is controlled.

18. Device for controlling data packet traffic at an input of a network, the traffic comprising N streams and/or sub-streams which are each associated with a priority level, N≧2, each of the packets being marked with the priority level associated with the streams or sub-stream to which said packet belongs, wherein said device comprises:
    means for receiving a packet and obtaining its priority level;
    a token bucket, which assigns tokens to said packet, if tokens are available for said packet, wherein the token buffer has N operating levels and N token buffers, each comprising a number of available tokens, the tokens of each of the N token buffers being used to process one of the N priority levels, wherein the tokens are assigned or not assigned to said packet depending on the tokens available at least in the token buffer used to process the priority level of said packet, and wherein each of the N operating levels is managed by a regulator $b_i(r_i, bm_i)$, $i \in \{1 \text{ to } N\}$, with:

$r_i$ a nominal bit rate of the regulator;

$bm_i$ a maximum size of the token buffer of the regulator;

$b_i(t)$ an instantaneous value of the filling of the token buffer of the regulator;

means for accepting said packet in a buffer forming a means for managing a queue if the packet has been assigned tokens; and means for rejecting said packet, if it has not been assigned tokens.

* * * * *